United States Patent [19]

Kim

[11] 4,273,693

[45] Jun. 16, 1981

[54] PREPARATION OF FURAN POLYMERS

[75] Inventor: Young D. Kim, Columbus, Ohio

[73] Assignee: Ashland Oil, Inc., Ashland, Ky.

[21] Appl. No.: 131,562

[22] Filed: Mar. 19, 1980

[51] Int. Cl.$^3$ .......................... C08J 3/00; C08L 61/00
[52] U.S. Cl. .......................... 260/29.2 N; 260/29.4 R;
528/249; 528/259; 528/266; 528/129
[58] Field of Search ..................... 260/29.2 N, 29.4 R;
528/249, 259, 266, 129

[56] References Cited

U.S. PATENT DOCUMENTS

| | | | |
|---|---|---|---|
| 3,312,650 | 4/1967 | Case et al. ........................... | 260/29.3 |
| 3,734,936 | 5/1973 | Brown et al. ................ | 260/29.4 R X |
| 3,893,964 | 7/1975 | Kawai et al. .................... | 260/29.4 R |
| 3,993,117 | 11/1976 | Chevriot et al. ........... | 260/29.4 R X |
| 4,178,429 | 12/1979 | Scheffer ..................... | 260/29.2 N X |

*Primary Examiner*—Lucille M. Phynes
*Attorney, Agent, or Firm*—Pollock, Vande Sande & Priddy

[57] ABSTRACT

A process for preparing a water-compatible furan polymer which includes subjecting a composition containing at least one saturated aliphatic monohydric alcohol; water; furfuryl alcohol; aldehyde; and nitrogen-containing compound to condensation reaction at an acidic pH; and the product obtained thereby.

28 Claims, No Drawings

PREPARATION OF FURAN POLYMERS

DESCRIPTION

1. Technical Field

The present invention is concerned with a process for preparing water-compatible nitrogen-containing furan polymers and with the polymers obtained thereby. The furan polymers prepared according to the present invention are stable and clear even in combination with relatively large amounts of water. The furan polymers prepared according to the present invention are especially useful as binders for molding compositions, such as refractories, abrasive articles, and molding shapes, such as cores and molds.

2. Background Art

Furan polymers have been used in the foundry industry as binders. Such polymers have been prepared from furfuryl alcohol with varying amounts of an aldehyde, such as formaldehyde, nitrogen-containing compound, such as urea and/or precondensates of an aldehyde and a nitrogen-containing compound, and a phenolic compound. The furfuryl alcohol condenses in the presence of an acid catalyst under acidic conditions. It is also known that aldehydes are condensed in alkali media in the presence of a basic catalyst. In fact, prior to the present invention, the practice of carrying out reaction first under basic conditions and then under acidic conditions in order to effect both the condensation of the furfuryl alcohol and aldehyde has been practiced. Also, processes have been suggested wherein condensation in an acid medium is followed by condensation in a basic medium, as is exemplified by U.S. Pat. No. 3,312,650 to Case et al.

Although many processes have been suggested for producing furfuryl alcohol polymers, a need remains to provide a nitrogen-containing furfuryl alcohol polymer which is compatible with water and is stable even when in the presence of relatively large amounts of water, such as up to about 30% by weight. Moreover, it is desirable to be able to provide such polymers without adversely affecting to an undesired degree the bonding properties of the furan polymer.

DISCLOSURE OF INVENTION

The present invention is concerned with a process for preparing water-compatible furan polymers. The process includes providing a composition which contains at least one saturated aliphatic monohydric alcohol having one to three carbon atoms, water, furfuryl alcohol, and aldehyde. The composition is subjected to a condensation reaction at an acidic pH in the presence of an acidic catalyst. The condensation reaction is carried out until the free aldehyde content of the composition is about 18 to about 22% by weight. When the free aldehyde content of the composition is about 18 to about 22% by weight, a nitrogen-containing compound containing at least one

is added, and the condensation reaction is continued at an acidic pH for a time sufficient to provide a polymer composition having a viscosity of about 0.5 to about 7 stokes at 25° C., and thereby obtaining said water-compatible furan polymer.

DESCRIPTION OF BEST AND VARIOUS MODES FOR CARRYING OUT INVENTION

The process of the present invention is concerned with producing a water-compatible furan polymer composition whereby the furan polymer is stable even in the presence of relatively large amounts of water (e.g. up to about 30% by weight of water) and forms clear solutions therein.

It is essential for achieving the objectives of the present invention that the condensation reactions be carried out in the presence of at least one alcohol. The alcohols employed are preferably saturated, aliphatic, monohydric alcohols containing 1 to 3 carbon atoms. Examples of suitable alcohols include methanol, ethanol, n-propanol, and isopropanol. Mixtures of these alcohols can be used when desired. The preferred alcohol is methanol. The alcohol is generally present in the reaction composition in amounts of about 1 to about 20% by weight, preferably about 1 to about 10% by weight, and most preferably about 2 to about 8% by weight.

In addition, the reaction is conducted in the presence of water. The water is generally present in amounts of about 5 to about 20% by weight, and preferably about 8 to 15% by weight based on the reaction composition.

Furfuryl alcohol is one of the required reactants and is usually present in amounts of about 20 to about 50% by weight, and preferably about 25 to about 50% by weight of the reaction composition.

The reaction composition employed in the present invention also contains an aldehyde such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde. Mixtures of aldehydes can be employed when desired. When formaldehyde is employed, such can be incorporated in any of its various forms, such as formalin, trioxane, and paraformaldehyde. In addition, all or a portion of the aldehyde can be added as a preconcentrate or precondensate, such as with the nitrogen-containing compound. The aldehyde is generally employed in amounts of about 15 to about 40% by weight, and preferably about 20 to about 30% by weight.

The reaction composition also includes a nitrogen-containing compound. The nitrogen-containing compound must include at least one

Examples of some suitable nitrogen-containing compounds are urea, thiourea, melamine, dicyandiamide, benzoguanamine, with the preferred nitrogen-containing compound being urea. Mixtures of nitrogen-containing compounds can be employed when desired. All or a portion of the nitrogen-containing compound is added to the reaction mass when the reaction has proceded to provide a free aldehyde content of about 18 to about 22% by weight based upon the weight of the reaction mass. Preferably about 50% to about 75% by weight of the total nitrogen-containing compound employed is added. Often the free aldehyde content has reached a value of about 18 to about 22% by weight based upon the weight of the reaction mass. In addition, it is preferred to add a protion of the nitrogen-containing compound as a preconcentrate or condensate with the aldehyde. In a preferred aspect of the present invention, the preconcentrate is present in the reaction composition during the initial stages of the condensation reaction.

The total amount of nitrogen-containing compound employed is generally in amounts of about 4 to about 35% by weight based upon the weight of the reaction composition, and preferably about 15 to about 25% by weight.

A preferred aldehyde-nitrogen containing compound precondensate employed is a urea-formaldehyde precondensate which contains about 60% by weight of formaldehyde, about 25% by weight of urea, and about 15% by weight of water. In addition, such is preferably employed in amounts of about 20 to 50% by weight, and most preferably about 25 to about 40% by weight of the reaction mixture. Furthermore, it is preferred when such a precondensate is employed to also incorporate about 2 to about 10% by weight of aldehyde, and most preferably formaldehyde either in the form of a 50% aqueous solution or as paraformaldehyde. The most preferred amount employed is about 10% by weight of a 50% solids aqueous solution of the formaldehyde.

In a preferred aspect of the present invention, the reaction is initially conducted in the presence of a basic catalyst under a pH of about 6.5 to about 8.

Any basic catalyst can be employed in this stage of the reaction. Examples of such basic catalysts include both inorganic and organic materials, such as metal hydroxides, metal carbonates, and amines. Examples of some catalysts include aluminum hydroxide, alkali metal hydroxides, such as sodium hydroxide, potassium hydroxide, alkaline-earth metal hydroxides, such as barium hydroxide, magnesium hydroxide, and cesium hydroxide; and amines, such as alkanolamines, including triethanolamine. Mixtures of basic catalysts can be employed when desired.

The preferred catalyst employed is triethanolamine. The catalyst is generally employed in amounts of about 0.1 to about 5% by weight based upon the weight of the reaction composition, and preferably about 0.1 to about 1% by weight.

This stage of the reaction can be carried out up to about ¾ hour, and preferably up to about ½ hour, and most preferably about ¼ to about ½ hour. The length of time necessary to carry out this stage of the reaction depends upon the temperature employed, and the relative amounts of the various reactants. The reaction is generally conducted at temperatures from about 70° to about 100° C.

In this preferred aspect of the present invention, the pH of the reaction composition is next adjusted to about 4 to about 5.5, and preferably 4.5 to about 5.5. This is accomplished by adding an acidic catalyst in sufficient amount to lower the pH to the desired value. Inorganic acids, organic acids, and organic acid anhydrides can be employed. Examples of some suitable acidic catalysts include phosphoric acid, hydrochloric acid, sulfuric acid, formic acid, oxalic acid, maleic acid, maleic anhydride, phthalic acid, phthalic anhydride, toluene sulphonic acid, benzene sulphonic acid, xylene sulphonic acid, propionic acid, and any mono- or dicarboxylic aliphatic acid having a constant of ionization sufficient to provide the desired pH. The preferred acid is formic acid. Mixtures of acidic catalysts can be employed when desired.

The acid catalyst is generally employed in amounts of about 0.3 to about 5% by weight, and preferably 0.5 to 1.5% by weight.

This stage of the reaction is usually carried out at temperatures of about 90° to about 105° C. The reaction is continued until the free aldehyde content is about 18 to about 22% by weight, at which time all or preferably about 50% to about 75% by weight of the total nitrogen-containing compound employed is added to the reaction mass. Obtaining a free aldehyde content of about 18 to about 22% by weight generally requires about ½ to about 2 hours, and preferably about ½ to about 1 hour.

After the nitrogen-containing compound is added at this stage, the reaction is continued under acidic pH conditions of about 4 to about 5.5, and preferably about 4.5 to about 5.5. If necessary, additional acidic catalyst can be added to maintain the pH in the desired acidic range. The entire reaction at the acidic pH condition of about 4 to about 5.5 usually takes about 1 to about 4 hours. The temperature of the entire reaction at the acidic pH condition of about 4 to 5.5 is usually about 90° to about 105° C. The reaction at this stage is continued until the viscosity of the composition is about 0.5 to about 7 stokes, and preferably about 1 to about 3 stokes.

After the reaction is completed at this stage, the free aldehyde content is usually about 2 to about 7% by weight.

Although the reaction composition can contain polymerizable and/or new polymerization materials in amounts which do not adversely affect the final product or process to an undesired extent, it is preferred that the reaction composition be free from polymerizable phenolic-compounds.

The furan polymers obtained from the present invention can be employed in room temperature cured nobake furan binder systems especially for foundry applications. In such instances, usually the furan polymer is admixed with up to about 90% by weight of additional furfuryl alcohol. The furan polymers can be cured employing acid catalysts, such as the inorganic acids including phosphoric acid, and organic acids, such as the organic sulphonic acids, including toluene sulphonic acid, benzene sulphonic acid, xylene sulphonic acid, and cumene sulphonic acid.

In molding compositions the furan polymer is admixed with an aggregate. The aggregate constitutes the major constituent, and the binder constitutes normally a relatively minor amount. In ordinary sand-type foundry applications, the amount of binder is generally no greater than about 10% by weight, and frequently within the range of about 0.5 to about 7% by weight based upon the weight of the aggregate. Most often the binder content range is from about 0.6 to about 5% by weight based upon the weight of the aggregate in ordinary sand-type foundry shapes.

Generally, at least about 80%, and most preferably about 90% by weight, of aggregate employed for foundry shapes has an average particle size no smaller than about 150 mesh (Tyler screen mesh). The aggregate for foundry shapes preferably has an average particle size between about 50 and about 150 mesh (Tyler screen mesh). The preferred aggregate employed for ordinary foundry shapes is silica sand, wherein at least about 70% by weight, and preferably at least about 85% by weight of the sand, is silica. Other suitable aggregate materials include zircons, olivine, aluminosilicate sand, chromite sand, and the like.

Of course, the binder compositions can be employed as binders in other molding compositions in the amounts and with aggregates well known to those skilled in the art.

A valuable additive to the binder compositions of the present invention in certain types of sand is a silane having the general formula:

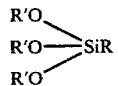

wherein R' is a hydrocarbon radical and preferably an alkyl radical of 1 to 7 carbon atoms and R is an alkyl radical, an alkoxy-substituted alkyl radical, or an alkylamine-substituted alkyl radical in which the alkyl groups have from 1 to 6 carbon atoms. The aforesaid silane, when employed in concentrations of 0.05 to 2% based on the binder component of the composition, improves the humidity resistance of the system. Mixtures of silanes can be employed when desired.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta (amino-ethyl)-gamma aminopropyltrimethoxy silane); and Union Carbide A-1160 (Ureido-silane).

When the compositions of the present invention are used to prepare ordinary sand-type foundry shapes, the following steps are employed:
1. forming a foundry mix containing an aggregate (e.g. sand) and the contents of the binder system;
2. introducing the foundry mix into a mold or pattern to thereby obtain a green foundry shape;
3. allowing the green foundry shape to remain in the molded pattern for a time at least sufficient for the shape to obtain a minimum stripping strength, i.e. become self-supporting; and
4. thereafter removing the shape from the mold or pattern allowing it to cure at room temperature, thereby obtaining a hard solid cured foundry shape.

In order to further understand the present invention, the following non-limiting examples are provided. All parts are by weight unless the contrary is stated. In all examples the foundry samples are cured by the so-called "no-bake" process.

EXAMPLE I

A reaction composition containing about 81 parts by weight of methyl alcohol; about 516 parts by weight of a urea-formaldehyde concentrate available from Georgia Pacific under the trade designation of StaForm 60, containing about 59.77 by weight formaldehyde, about 24.6 by weight urea, and about 15.63% by weight water, a viscosity of about 280 cps at 25° C., pH about 8.1, specific gravity about 1.322, and a mole ratio of formaldehyde to urea of 4.86:1; about 523.2 parts by weight furfuryl alcohol; about 153 parts by weight of 50% solution of formaldehyde; and about 7 parts by weight of triethanol amine to provide a pH of about 7.65 is provided. The composition is added to a reaction vessel and is heated at about 88° C. for about 20 minutes. At this time, about 8 parts by weight of a 25% solution of formic acid are added to the composition and the pH is about 5.25.

The composition is then heated under reflux (e.g. about 100° to about 101° C. for about 50 minutes) at which time the free formaldehyde content is about 20%. At this point, about 204.3 parts by weight of urea is added to the composition, and the temperature drops to about 70° to about 80° C. The pH of the reaction is adjusted to about 5.1 by the addition of 6 parts by weight of a 25% aqueous solution of formic acid. The composition is maintained under reflux conditions from about 100° to about 102° C. for about 3 hours and 35 minutes during which time about 7 more parts by weight of the 20% by weight aqueous solution of formic acid are added to the reaction mixture. At the end of the reaction, the pH is adjusted to about 7.3 by the addition of about 8 parts by weight of triethanolamine and the free formaldehyde content is about 4.8. The viscosity of the reaction mass is about 2 stokes. The product contains about 10.29% by weight nitrogen, about 17.69% by weight water, about 60.25% by weight of nonvolatiles at 150° C., and about 18.76% by weight of furfuryl alcohol. The stability of the composition is found to be quite good.

EXAMPLE II

A composition containing about 81 parts by weight of methanol; about 516 parts by weight of urea-formaldehyde concentrate (UF-85) containing about 60% by weight formaldehyde, about 25% by weight urea, and about 15% by weight water; about 523.2 parts by weight of furfuryl alcohol; about 153 parts by weight of a 50% aqueous solution of formaldehyde, and about 9 parts by weight of triethanolamine to provide a pH of about 7.7 is prepared and charged to a reaction vessel. The reaction mass is heated to a temperature of about 88° C. and held there for about 20 minutes. Then about 8 parts by weight of 25% by weight formic aqueous solution are added to the reaction mass to provide a pH of about 4.6. The reaction mass is heated to reflux (e.g. about 100° C.) for about 50 minutes at which time the free formaldehyde content is about 19.9%. About 204.3 parts by weight of urea are added and the reaction mass is heated for about 2 hours and 11 minutes at reflux (about 101° C.). During this time an additional 7.9 parts by weight of the 25% aqueous formic acid solution are added. At the end of the reaction, the pH is adjusted to about 7.2 by the addition of about 3 parts by weight of 50% aqueous solution of sodium hydroxide. The product has a free formaldehyde content of about 5.8, a viscosity of T-V, and a refractive index of about 1.4945.

EXAMPLE III

About 100 parts by weight of Wedron 5010 silica sand and about 1.5 parts by weight of a binder component obtained from about 70 parts by weight of the furan polymer from Example I and about 30 parts by weight of furfuryl alcohol and about 0.15 parts by weight of gamma aminopropyltriethoxysilane are admixed for about 2 minutes. To this mixture is added about 0.6 parts by weight of an aqueous 80% phosphoric acid catalyst solution. The mixture is then agitated for about 2 minutes.

The resulting foundry mix is formed into a standard AFS tensile strength sample using the standard procedure. The results for 3 samples each are presented in Table I hereinbelow.

EXAMPLE IV

Example III is repeated except that the furan resin is obtained according to the procedure of Example II. The average results obtained from 3 test samples are presented hereinbelow in Table I.

| EXAMPLE | III | IV |
| --- | --- | --- |
| Work Time, Min. | 15 | 11 |
| Strip Time, Min. | 24 | 18 |
| Tensile Strength, psi | | |
| 1 hour | 193(81)* | 207(82) |
| 3 hours | 343(88) | 345(87) |
| 24 hours | 420(90) | 400(89) |
| 24 hours + 1 hour 100% relative humidity | 313(87) | 287(86) |
| Formaldehyde/Urea Ratio | 2.3/1 | 2.3/1 |
| pH | 5.1 | 4.7 |
| Visc. Stokes | 1.4–1.7 | 1.8 |

*Scratch Resistance

What is claimed is:

1. A process for preparing a water-compatible nitrogen-containing furan polymer which comprises:
   providing a composition containing at least one saturated aliphatic monohydric alcohol having 1–3 carbon atoms, water, furfuryl alcohol, and aldehyde;
   subjecting the composition to condensation reaction at an acidic pH in the presence of an acidic catalyst until the free aldehyde content is about 18 to about 22% by weight;
   adding a nitrogen-containing compound containing at least one

when said free aldehyde content is about 18 to about 22% by weight; and
   then continuing the condensation reaction at an acidic pH for a time sufficient to provide a polymer composition having a viscosity of about 0.5 to bout 7 strokes at 25° C., and thereby obtaining said water-compatible furan polymer.

2. The process of claim 1 wherein said alcohol is selected from the group of methanol, ethanol, n-propanol, isopropanol, or mixtures thereof.

3. The process of claim 1 wherein said alcohol is methanol.

4. The process of claim 1 wherein said aldehyde is formaldehyde.

5. The composition of claim 1 wherein said nitrogen-containing compound is selected from the group of urea, thiourea, dicyandiamide, melamine, benzoguanamine, or mixtures thereof.

6. The process of claim 1 wherein said nitrogen-containing compound is urea.

7. The composition of claim 1 wherein at least a portion of said aldehyde and said nitrogen-containing compound is incorporated as a precondensate of said aldehyde and said nitrogen-containing compound.

8. The process of claim 7 wherein said precondensate is a precondensate of urea-formaldehyde.

9. The process of claim 9 wherein said precondensate of urea-formaldehyde contains about 60% by weight of formaldehyde, about 25% by weight of urea, and about 15% by weight of water.

10. The process of claim 1 wherein said alcohol is present in an amount from about 1 to about 20% by weight, said water is present in an amount from about 5 to about 20% by weight, said furfuryl alcohol is present in an amount from about 20 to about 50% by weight, said aldehyde is present in an amount from about 15 to about 40% by weight, and said nitrogen-containing compound is present in an amount from about 4 to about 35% by weight.

11. The process of claim 1 wherein said alcohol is present in an amount from about 1 to about 10% by weight, said water is present in an amount from about 8 to about 15% by weight, said furfuryl alcohol is present in an amount from about 25 to about 50% by weight, said aldehyde is present in an amount from about 20 to about 30% by weight, and said nitrogen-containing compound is present in an amount from about 15 to about 25% by weight.

12. The process of claim 11 wherein said alcohol is present in an amount from about 2 to about 8% by weight.

13. The process of claim 9 wherein said precondensate of urea-formaldehyde is present in an amount from about 20 to about 50% by weight.

14. The process of claim 9 wherein said precondensate of urea-formaldehyde is present in an amount of about 25 to about 40% by weight.

15. The process of claim 9 which further includes incorporating about 2 to about 10% by weight of free formaldehyde.

16. The process of claim 8 wherein said precondensate of urea-formaldehyde is present during the initial stages of the reaction.

17. The process of claim 16 wherein said initial stages are carried out in the presence of a basic catalyst under pH conditions of about 6.5 to 8.

18. The process of claim 17 wherein said basic catalyst is triethanolamine.

19. The process of claim 17 wherein said basic catalyst is sodium hydroxide.

20. The process of claim 17 wherein said basic catalyst is present in an amount from about 0.1 to about 5% by weight based upon the weight of the reaction composition.

21. The process of claim 17 wherein said basic catalyst is present in an amount from about 0.1 to about 1% by weight based upon the weight of the reaction composition.

22. The process of claim 1 wherein the condensation with the pH conditions of about 6.5 to about 8 is carried our for up to about ¾ hour.

23. The process of claim 1 wherein said acidic pH conditions are about 4 to about 5.5.

24. The process of claim 1 wherein said acidic pH conditions are about 4.5 to about 5.5.

25. The process of claim 1 wherein said acidic catalyst is formic acid.

26. The process of claim 16 wherein about 50 to about 75% by weight of said nitrogen-containing compound is added when said free aldehyde content is about 18 to about 22% by weight.

27. The process of claim 1 wherein said nitrogen-containing compound contains at least one

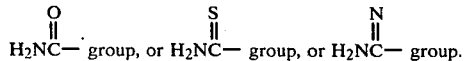

28. The product obtained by the process of claim 1.

* * * * *